United States Patent [19]

Okamura et al.

[11] Patent Number: 4,942,094
[45] Date of Patent: Jul. 17, 1990

[54] SILICONE RESIN-MICA LAMINATE AND METHOD OF MANUFACTURING THEREOF

[75] Inventors: Yoshio Okamura; Kouichi Tanaka, both of Annaka, Japan

[73] Assignee: Shin-Etsu Chemical Co., Ltd., Tokyo, Japan

[21] Appl. No.: 221,577

[22] Filed: Jul. 20, 1988

[30] Foreign Application Priority Data

Jul. 21, 1987 [JP] Japan .................................. 62-182050

[51] Int. Cl.$^5$ ...................... B32B 19/00; B32B 21/12; B32B 19/04
[52] U.S. Cl. .................................. 428/447; 428/324; 428/363; 428/405; 428/448
[58] Field of Search ............... 428/324, 363, 405, 448, 428/447

[56] References Cited

U.S. PATENT DOCUMENTS

| | | | |
|---|---|---|---|
| 4,151,154 | 4/1979 | Berger | 428/405 |
| 4,175,159 | 11/1979 | Raleigh | 428/405 |
| 4,244,911 | 1/1981 | Ishizaka | 428/324 |
| 4,797,446 | 1/1989 | Dietlein | 428/447 |
| 4,800,127 | 1/1989 | Saad | 428/447 |

Primary Examiner—Ellis P. Robinson
Assistant Examiner—Amy Hulina
Attorney, Agent, or Firm—Millen, White & Zelano

[57] ABSTRACT

A silicone resin-mica laminate and a method of manufacturing the same made up of laminated mica consisting of at least two mica layers, each of which is covered on both sides by a silicone resin layer bonded thereto by a bonding layer produced from a mixture of an amino group-containing alkoxysilane compound and/or a hydrolyzed derivative thereof an epoxy group-containing organic silicon compound.

5 Claims, No Drawings

SILICONE RESIN-MICA LAMINATE AND METHOD OF MANUFACTURING THEREOF

BACKGROUND OF THE INVENTION

The present invention relates to a silicone resin-mica laminate and a method of manufacturing thereof. More particularly, the invention relates to a silicone resin-mica laminate which has excellent water resistance, electrical insulation and heat resistance, and whose properties are stable even when in contact with water, and to a method for its manufacture.

Mica is known to be a material having extremely good electrical insulation and heat resistance, and silicone resin on the other hand is known to have excellent electrical insulating and heat resistance properties.

Lately, a silicone resin-mica laminate has come to be used in the form of a laminate of mica films bound together by a silicone resin binder. This kind of silicone resin-mica laminate takes advantage of the excellent properties of the mica and the silicone resin, such as electrical insulation and heat resistance.

Ordinarily, a silicone resin-mica laminate has good electrical insulation and heat resistance properties. However, when the manufacturing conditions or the conditions under which it is used are unfavorable, the properties of the silicone resin-mica laminate are apt to be ill-affected.

For example, if the silicone resin-mica laminate is maintained for a long period in a place of high humidity, or when it is in contact with moisture, the water penetrates the mica layers, thereby greatly impairing the electrical properties and the mechanical strength.

Various proposals have been made with a view to solving this problem.

Examples are Japanese Laid-open Patent Application Nos. 53-149250, 55-90556, and 53-149251, and Japanese Patent Publication No. 53-777, which disclose inventions relating to a manufacturing method for the production of silicone resin-mica laminate characterized in that a binder solution is prepared by (i) mixing a silicone resin as the binding agent and a phosphoric acid catalyst as the curing catalyst with a silane coupling agent, oxime silane, epoxy resin, etc. and (ii) modifying the catalyst, and in that the mica films are bound together to form a laminate by means of the binder solution.

Although the thus-obtained silicone resin-mica laminates obtained show some improvement in water resistance, the life of the binder solution is so short that the manufacturing condition becomes more restrictive. Also, since certain additives used in the binder solution are only poorly soluble in solvents, the binder solution is difficult to spread uniformly over the surfaces of the laminated mica. Another problem is that, when heated to high temperatures, the silicone resin-mica laminate is susceptible of color change and fuming.

There is also known a method capable of imparting such properties as water resistance to an inorganic substance, which generally comprises the steps of treating the inorganic substance with a silane coupling agent and having a resin body impregnated by the inorganic substance.

Although this method is often effective when applied to conventional organic resins, it fails to sufficiently improve the properties such as water resistance of a laminate if the laminate is a silicone resin-mica laminate made up of mica and silicone resin pre-treated only with silane coupling agent.

Further, the following problems are associated with the manufacturing of a silicone resin-mica laminate.

Generally, a laminated mica has a tendency of adsorbing as well as releasing atmospheric moisture and this moisture affects the quality of the mica so much that it is important to monitor the humidity for proper quality control. When the humidity is high, the silicone resin-mica laminate produced will be poor in mechanical strength and water resistance and on the other hand when the humidity is too low, the resulting silicone resin-mica laminate will be less flexible and very brittle. Therefore, even if pieces of mica from the same lot are used, the resulting silicone resin-mica laminate shows different properties depending on the humidity of the atmosphere at the time when the respective silicone resin-mica laminate is made. For example, it is difficult to maintain the good properties of the silicone resin-mica laminate if it is manufactured during the rainy season when the humidity rises high or during the midwinter when the humidity is very low.

Such effect of humidity is experienced not only seasonally but also in a single day in extremely cases in which the weather of the day changes very drastically. For example, it is possible that a piece of silicone resin-mica laminate manufactured in the morning will have properties much different from those of another piece manufactured in the evening of the same day.

To solve this problem, the plant could be sealed from the outside air or air-conditioned to thereby maintain the indoor humidity at a desirable value. However, these measures are impractical because the large volumes of solvents used in the plant cannot safely be kept therein and sealing or air-conditioning the plant would require a considerable amount of investment for installation of the equipment for those purposes.

As measures for improving the water resisting property of the silicone resin-mica laminate, there have been proposed methods such as disclosed in Japanese Patent Publication No. 50-35240 and Japanese Patent Publication No. 61-10922, the latter being characterized in that an aqueous binder solution containing aminosilane and oximsilane is employed for pre-treatment of the laminated mica, and the former being characterized in that the laminated mica is pre-treated with oximsilane.

The inventors of the present invention first considered whether it would be possible to manufacture a silicone resin-mica laminate scarcely affected by atmospheric moisture by employing those proposed methods. However, their tests indicated that while the water-resistance property of the manufactured silicone resin-mica laminate was certainly improved more or less, the unfavorable effect of the humidity during the manufacturing process was not avoided.

Therefore, there existed no known means effective to improve the water resistance, heat resistance, and electrical insulation properties of silicone resin-mica laminate, and at the same time to render the silicone resin-mica laminate resistant to the effects of humidity.

OBJECT OF THE INVENTION

It is the primary object of the invention to provide a silicone resin-mica laminate which has excellent water resistance, electrical insulation and heat resistance.

A second object of the invention is to provide a silicone resin-mica laminate which has excellent water resistance, electrical insulation, and heat resistance and additionally is substantially immune from unfavorable effects of humidity during its manufacturing process.

A third object of the invention is to provide a method of manufacturing a silicone resin-mica laminate which is excellent in water resistance, electrical insulation and heat resistance.

A fourth object of the invention is to provide a method of manufacturing a silicone resin-mica laminate which is characterized in that the silicone resin-mica laminate is quite immune from the unfavorable effects of humidity during the manufacturing process.

The foregoing and other objects, features and advantages of the present invention will be apparent from the following detailed description thereof.

SUMMARY OF THE INVENTION

The foregoing objectives are attained by a silicone resin-mica laminate formed from at least two sheets of laminated mica and which comprises (i) mica layers whose surfaces are coated with intermediate (ii) layers of a composition produced by curing a mixture of (a) an amino group-containing alkoxysilane compound and/or a hydrolyzed derivative thereof, and (b) an epoxy group-containing organic silicon compound, and with (iii) silicone resin layers, each neighboring pair of mica and silicone resin layers sandwiching an intermediate layer (ii) therebetween, the epoxy group-containing organic silicon compound being a partially etherified disubstituted trisiloxane one of whose substituents bears an epoxy substituent, e.g., a siloxane of Formula I:

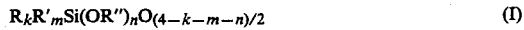  (I)

wherein R is a monovalent organic group having at least one epoxy group, R' and R" are, respectively, a hydrogen atom or a substituted or unsubstituted monovalent hydrocarbon group, and k, m, and n are positive numbers satisfying the inequalities:

$0.2 \leq k \leq 1$ $0 \leq m \leq 3$ $0 \leq n \leq 3$ $2 \leq k+m+n \leq 4$.

In a method aspect, the silicone resin-mica laminate of this invention are manufactured by a method comprising the steps of:

(a) forming on the surfaces of at least two mica layers an intermediate layer of a composition comprising an amino group-containing alkoxysilane compound and/or a hydrolyzed derivative thereof and an epoxy group-containing organic silicon compound represented by formula (I); thereby producing intermediate coated mica layers, (b) forming a silicone resin layer over each of the thus-coated surfaces of the mica layers, such that each intermediate layer formed in step (a) is sandwiched between a silicone resin layer and a mica layer, thereby forming silicone resin coated laminated mica sheets, (c) laminating together at least two of the laminated mica sheets produced by steps (a) and (b) by applying pressure and heat thereto.

DETAILED DESCRIPTION

The silicone resin-mica laminate according to the invention shall be explained in detail in relation to the method of manufacturing thereof according to the invention.

The first step [step (a)] of the method according to the invention consists in coating both surfaces of a plurality of layers of mica with the layer of a composition comprising an amino group-containing alkoxysilane compound and/or a hydrolyzed derivative thereof (hereinafter, occasionally referred to collectively as "the element A"), and an epoxy group-containing organic silicone compound (hereinafter, occasionally referred to as "the element B").

The mica employed in the present invention may be a natural mica such as muscovite, paragonite, phlogopite, biotite, and syrian mica, or a synthetic mica such as fluorine-contained phlogopite, fluorine/silicone-contained mica, and taeniolite. The mica can be used either baked or unbaked. Muscovite and phlogopite are preferred because they are industrially easy to obtain.

The thickness of the mica used in the present invention can vary from about 0.01 mm to about 0.5 mm and is preferably 0.02 mm to 0.1 mm.

The amino group-containing alkoxysilane compound or a hydrolyzed derivative thereof (the element A) employed in the invention may be any amino group-containing alkoxysilane compound, but preferable is compound represented by formula (II) or a hydrolyzed derivative thereof:

  (II)

wherein A is a hydrogen atom, or a group selected from an alkyl group having up to 8 and preferably up to 5 carbon atoms e.g. methyl, ethyl, propyl, butyl, pentyl, hexyl, heptyl and octyl, an aryl group which is preferably carbocyclic, e.g., monocyclic or bicyclic such as phenyl, naphthyl, biphenyl, which is unsubstituted or substituted with one or more groups, such as an alkyl group, a halogen atom, a nitro group; an aminoalkyl group in which the nitrogen atom is bonded to one or more alkyl groups having one, two, or three carbon atoms, e.g. an aminomethyl group, aminoethyl group, and aminopropyl group.

In formula (II), $R^1$ is a bivalent bridging hydrocarbon group, preferably having one, two, or three carbon atoms in the bridging chain such as methylene, ethylene, and propylene. $R^2$ and $R^3$ are alkyl groups having three or fewer carbon atoms, such as methyl group, ethyl group, and propyl group. In formula (II), n is either 0 or 1.

The amino group-containing alkoxysilane compound used in the present invention is preferably one of or a mixture of two or more of the following: γ-aminomethyltrimethoxysilane; γ-aminomethyltriethoxysilane; γ-aminopropyltrimethoxysilane; γ-aminopropyltriethoxysilane; γ-aminopropyltripropoxysilane; γ-aminopropylmethyldimethoxysilane; γ-aminopropylmethyldiethoxysilane; γ-aminopropylethyldiethoxysilane; γ-aminopropylpropyldiethoxysilane; N-β-(aminoethyl)-γ-aminopropyltrimethoxysilane, N-β-(aminoethyl)-γ=aminopropylmethyldimethoxysilane, and N-phenyl-γ-aminopropyltrimethoxysilane.

It is also possible to use one of or a mixture of two or more of the hydrolyzed or semi-hydrolyzed products of these compounds. In such hydrolyzed products, all the alkoxyl groups are replaced by hydroxylic groups, and in semi-hydrolized products some of the alkoxyl groups are left intact.

The hydrolyzed and the partially hydrolyzed of those compounds are easily obtained in a known manner, e.g., by heating the compounds in the presence of an appropriate amount of water.

The epoxy group-containing organic silicone compound (the element B) used in the present invention preferably is any compound represented by formula (I).

Examples of the epoxy group-containing organic silicone compound represented by formula (I) include epoxy group-containing silanes represented by formula (I') below and the partially hydrolyzed derivatives thereof of the same silanes, which may be used singly or in any combination in the invention.

$$RR'_p Si(OR'')_{3-p} \qquad (I')$$

wherein R, R', and R'' are the same as those in formula (I), and p is either 0 or 1.

The epoxy group-containing silane (the element B) may, for example, be γ-glycidoxypropyltrimethoxysilane, γ-glycidoxypropyltriethoxysilane, γ-glycidoxypropylmethyldimethoxysilane, γ-glycidoxypropylmethyldiethoxysilane, β-(3,4-epoxycyclohexyl)ethyltrimethoxysilane, β-(3,4-epoxycyclohexyl)ethyltriethoxysilane, or β-(3,4-epoxycyclohexyl)ethylmethyldimethoxysilane.

Also, without departing from the scope of the invention, it is possible to use, as the partially hydrolyzed derivative of the element (A) the product resulting from cohydrolysis of a mixture of epoxy group-containing silane represented as (I') and an organoalkoxysilane represented by formula (III):

$$R'_v Si(OR'')_{4-v} \qquad (III)$$

where R' and R'' are the same as those in Formula (I), and v is 0, 1, or 2.

The cohydrolyzed product is easily prepared in the following manner: the required amount of water and a trace of an acid are added to a mixture of an epoxy group-containing silane and an organoalkoxysilane as defined above; then, the mixture is stirred.

The element (B) represented by formula (I) may be an epoxy group-containing siloxane represented by formula (IV) or (V):

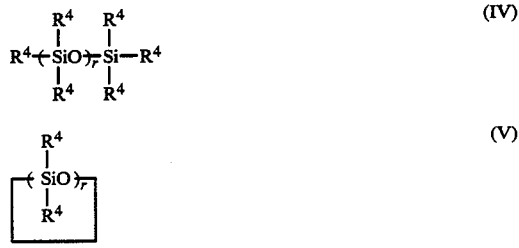

where $R^4$ represents a hydrogen atom, a monovalent organic group containing a monovalent substituted or unsubstituted hydrocarbon group as defined above for A, at least one $R^4$ representing an epoxy group-containing organic group. In formulas (IV) and (V), r is an integer such that $3 \leq r \leq 15$.

This epoxy group-containing siloxane can be easily prepared in the following manner: an organopolysiloxane having the same skeletal structure as the desired epoxy group-containing siloxane, and having hydrogen atoms directly bonded to silicon atoms is made in any known manner; then, a compound containing an epoxy group and an unsaturated group, e.g. allylglycidyl ether, is mixed with this organopolysiloxane and a reaction is initiated in the presence of a platinum catalyst at a raised temperature whereby the hydrogen atoms bonded to the silicon atoms are attacked.

The element (B) thus obtained is represented by formula (I), wherein k and m are preferably in the ranges of $0.2 \leq k \leq 2$ and $0 \leq m \leq 2$, respectively, for if k is smaller than 0.1 or if m is greater than 3, the water resistance of the resulting silicone resin-mica laminate will tend to be poor.

Referring to formula (I), although there is no limit to the value of n, it has been found that if n is 3 or greater in the cases wherein the element (B) is a silane or a co-hydrolyzed derivative of a silane, the resulting silicone resin-mica laminate will have greater tendency to be susceptible to the effects of the external moisture during the manufacturing process.

When element (B) is either a compound represented by Formula (IV) or (V), sufficient water resistance is obtained, even if n is zero, so long as r is an integer such that $3 \leq r \leq 15$. The optimum value for n is from 0 to 3, inclusive.

Preferably, the sum of k, m, and n is from 2 to 4, inclusive.

The mixing of the element (A) with the element (B) is preferably carried out in a ratio of between 90:10 (more preferably 80:20) and 10:90 (more preferably 20:80) by weight %. If the mixing ratio of the element (A) with the element (B) is beyond these limits, the moisture resistance as well as the water resistance will be poor.

In the present invention, the laminated mica made up of any of the already named micas is treated with the amino group-containing alkoxysilane compound and/or the hydrolyzed product of the same (element A) as well as with the epoxy group-containing organic silicone compound (element B).

The treatment can be conducted either by applying to the surface of the laminated mica the mixture liquid of the elements (A) and (B) or the partially co-hydrolyzed derivative of the mixture liquid, or by applying the mixture to the surface after maturing the same.

The manner of applying the mixture or matured mixture to the surface of the laminated mica may be conducted in any conventional manner, e.g., by brushing, spraying, dipping, or the like.

It is preferable that the liquid mixture of the elements (A) and (B) for the treatment of the surface of the laminated mica is dissolved, prior to its application to the laminated mica, in an organic solvent such as a hydrocarbon solvent, e.g. benzene, toluene, xylene, petroleum ether, and ligroin; an alcohol, e.g. methyl alcohol, ethyl alcohol, and isopropyl alcohol; an ether, e.g. diethyl ether, methylethyl ether, and dipropyl ether; a ketone, e.g. methylethyl ketone and methylphenyl ketone, or a mixture thereof.

Preferably, the amount of the mixture of elements (A) and (B) applied to the surface of the laminated mica is such that it accounts for 0.01-5 weight % (more preferably 0.03-3 weight %) of the weight of the resulting laminated mica (weight after baking).

If the amount of the mixture applied exceeds 5 weight %, the resulting silicone resin-mica laminate will have a tendency to fume and give off an odor when heated, while the benefit obtained from the thick application would be small and far from making up for the disadvantage of increased manufacturing cost.

After treating the laminated mica with the liquid mixture, the laminated mica bearing the mixture is normally heated to a temperature below the curing temperature of the coating. The heating temperature ordinarily is below 200° C. (preferably between 80° C. and 140° C.) and the heating time ordinarily is longer than 0.1 minute (preferably between 0.2 minute and 10 minutes).

Heating the laminated mica in this manner causes the organic solvent and any other volatiles in the coating of the liquid mixture on the laminated mica to evaporate, thereby allowing formation of a layer over the surface of the thus-coated mica, the layer being composed of the elements (A) and (B) and the reaction product of the elements (A) and (B).

Mica is a singular crystal substance having a high aspect ratio, and a laminated mica is unique in its behaviors due to its structure consisting of very fine mica fragments accumulated and oriented in one direction.

It is not known why the treatment with the mixture of the invention is effective, but it is assumed that the elements (A) and (B) and the reaction product between (A) and (B) form a mixture that quickly permeates into the gaps between the mica crystals and at the same time reacts with the water adsorbed on the mica surfaces which causes silanol groups to attach themselves strongly to the surface, whereby the surface is chemically reformed.

Further, the alkoxy groups in the treatment mixture react with water to form silanol groups which have a high affinity to the silicone resin, so that the permeation of the silicone with which the laminated mica is subsequently impregnated is faciliated, and the adhesiveness is improved.

The curing of the silicone resin is known to be retarded in the presence of water, but treatment mixture is effective in removing the superfluous water existing on the surfaces of the laminated mica, and also the treatment mixture is effective in preventing further adsorption of water, thereby improving and stabilizing the curing rate. It is postulated that these phenomena cooperate to achieve the remarkable effect on the properties of the final laminate.

In the second step [step (b)] of the process according to the invention a silicone resin layer is formed over the layer formed in the step (a) and thus over the mica surface, whereby the laminated mica impregnated with the silicone resin is obtained.

The silicone resin used in this step may be a commonly used silicone resin, but especially good results with respect to strength and heat resistance of the silicone resin-mica laminate is desired, it is recommended to use a silicone resin which is made of an organo siloxane polymer mainly composed of a repetition of trifunctional siloxane units, intersperced with monofunctional, difunctional, and tetrafunctional siloxane units, depending on particular preferances, and also having hydroxyl groups within each molecule. It is more preferable to use a silicone resin of the kind which cures itself when it is heated or placed in the presence of a curing catalyst.

Particularly effective are organosiloxanes of formula (VI)

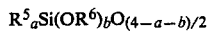

$$R^5{}_a Si(OR^6)_b O_{(4-a-b)/2} \quad \text{(VI)}$$

in which $R^5$ is a hydrogen atom or a monovalent hydrocarbon group having one through nine carbon atoms.

$R^5$ may be, for example, methyl, ethyl, propyl, cyclohexyl, phenyl, butyl, $\alpha$-methylstyryl, vinyl, or propenyl. $R^6$ is a hydrogen atom or a monovalent hydrocarbon group having one through four carbon atoms, e.g., methyl, ethyl, propyl, and butyl.

In the above formula (VI), a and b are numbers such that $0.8 \leq a \leq 1.4$ and $0.01 \leq b \leq 0.3$.

The silicone resins as described above are normally used as a solution in an organic solvent, e.g., any organic solvent which will dissolve the silicone resin. However, aromatic compound-based solvents, alcohols and ketones are ordinarily used.

In the present invention, it is also preferable to use a curing catalyst for the silicone resin. Examples of the curing catalysts to be used in the method of the invention are:

metallic salts of fatty acids, the metal component being such as zinc, iron, tin, lead, and cobalt;

amines including silane coupling agents based on amine, and the salts of these amines;

organic acids;

inorganic acids such as phosphoric acid and the derivatives thereof such as esters; and metallic chelate compounds, the metal component being such as aluminum and titanium.

Among these catalysts, inorganic acids are more preferred, and phosphoric acid is the most recommended. The use of a catalyst based on phosphoric acid enables easy controlling of the curing time and, more importantly, it reduces the possibility of coloring of the silicone resin-mica laminate, even when the laminate is subjected to a high curing temperature.

The dosage of the catalyst is ordinarily 0.1 to 10 parts by weight per 100 parts by weight of silicone resin.

The method for forming the silicone resin layer may be any usual method. For example, the treated mica resulting from the treatment step (a) may be dipped in an organic solvent solution of the silicone resin prepared in the above-described manner or the solution may be applied by brushing or spraying to the treated mica.

The amount of the silicone resin applied is preferably 3–30 wt % of the weight of the resulting laminated mica. Smaller amounts of the silicone resin would lead to a weak bonding strength, and poor durability and electrical insulation. Excessive amounts lead to an increased tendency to swell at high humidities and release odor and fume at high curing temperature as well as cost increase. The optimum range for the dosage is 5–15 wt % of the weight of the resulting laminated mica.

Ordinarily, the mica coated with the silicone resin is dried by heat. The heating temperature normally is preferably 200° C. or lower (more preferably 100°–150° C.). The heating time is preferably 0.1 minute or longer (more preferably 0.5–10 minutes). This drying by heat removes the organic solvent.

The laminated mica coated with the silicone resin in this manner is generally called a prepreg.

The third step [step (c)] of the invention comprises laminating together at least two sheets of the prepreg prepared in the step (b) by applying pressure and heat.

The hot press method is normally used as the method of laminating the prepreg sheets together, which is carried out under conditions of high temperature and high pressure. When the hot press method is employed the heating temperature is preferably 100° C. or higher (more preferably 150°–250° C.), the pressure is 5 kg/cm² or higher (more preferably 5–100 kg/cm²), and the hot-pressing time is 5 minutes or longer (more preferably 10–180 minutes).

The silicone resin-mica laminate obtained in the manner described above has a construction made up of at least two sheets of a laminated mica (prepreg) comprising (i) the mica layers, (ii) the intermediate layers composed of a mixture of (a) amino group-containing alkoxysilane compound and/or the hydrolyzed derivative thereof and (b) an epoxy group-containing organic silicon compound, and (iii) the silicone resin layers covering the mica layers (i), with the intermediate layers (ii) sandwiched therebetween. The silicone resin-mica laminate thus fabricated has excellent water resistance, heat resistance and mechanical strength. These properties recommend the laminate as a good material for electrical parts and heat resistive parts.

The silicone resin-mica laminate according to the invention has been explained so far in relation to a preferred method of manufacturing it, but it should be noted that the method of manufacturing the silicone resin-mica laminate of the invention is by no means limited to the above-described procedures.

The silicone resin-mica laminate according to the invention is low in moisture absorption tendency, and therefore it undergoes little change in electrical properties, such as volume resistivity and mechanical properties including bending strength, which are often observed in materials when their moisture content increases.

Therefore, the silicone resin-mica laminate according to the invention is able to maintain its properties stably for a long time under highly humid conditions.

Furthermore, since the laminated mica is very slow at absorbing moisture from the air, the properties of the silicone resin-mica laminate scarcely change during the manufacturing process even if the weather changes drastically, and for the same reason the properties do not vary with changes in climate throughout the four seasons. Thus, it is possible to continuously manufacture silicone resin-mica laminates of high quality.

EXAMPLES

The effects of the invention is described with reference to the following examples, but the invention is in no way limited thereto.

In the examples, the term "part" or "parts" hereinbelow mean "part by weight" or "parts by weight".

EXAMPLES 1 THROUGH 4

Treater Samples I through IV were prepared in the manners described in the respective paragraphs below, and each Treater Sample is measured such that the sum of the elements (A) and (B) would account for 0.2 wt % of unbaked laminated muscovite having a thickness of 0.05 mm. The thus-measured Treater Samples I through IV were diluted in four times as much toluene, respectively. The whole of one of the thus-prepared toluene solutions of Treater Samples I through IV was applied to the surface of a mica sheet which was then dried at 105° C. for five minutes.

Compositions of Treater Samples

Treater Sample I (used in Example 1)

Treater Sample I was prepared by mixing together 100 parts of γ-aminopropyltriethoxysilane (KBE-903, a trade name of and manufactured by Shin-Etsu Chemical Co., Ltd.), 100 parts of γ-glycidoxypropyltrimethoxysilane (KBM-403, a trade name of and manufactured by Shin-Etsu Chemical Co., Ltd.), and 800 parts of toluene.

Treater Sample II (used in Example 2)

Treater Sample II was prepared by the following procedure: 100 parts of γ-aminopropyltrimethoxysilane (KBM-903, a trade name of and manufactured by Shin-Etsu Chemical Co., Ltd.) was mixed with 792 parts of ethyl alcohol; the resulting mixture was stirred while 8.1 parts of water was dripped therein at a rate such that it took 30 minutes to drip the 8.1 parts; the mixture was heated at 60° C. for three hours; thereafter, added to this were 100 parts of β-(3,4-epoxycyclohexyl)ethyltrimethoxysilane (KBM-303, a trade name of and manufactured by Shin-Etsu Chemical Co., Ltd.); and the mixture was heated at 60° C. for three hours, whereby the Treater Sample II was obtained.

Treater Sample III (used in Example 3)

Treater Sample III was prepared by the following procedure: a mixture was made from 100 parts of γ-glycidoxypropyltrimethoxysilane (KBM-403), 58 parts of methyltrimethoxysilane, and 200 parts of ethyl alcohol; and to this 15.3 parts of water and 0.01 part of acetic acid were added in this order; the mixture was stirred at 60° C. for six hours; then, 100 parts of γ-aminopropylmethyldiethoxysilane (KBE-902, a trade name of and manufactured by Shin-Etsu Chemical Co., Ltd.) and 527 parts of ethyl alcohol were added to the mixture, which was subsequently heated at 60° C. for three hours, whereby the Treater Sample III was obtained.

Treater Sample IV (the treater sample used in Example 4)

Treater Sample IV was prepared by the following procedure: 66.7 parts of hydrogenpolysiloxane represented by the formula (VI) below were mixed with 33.3 parts of acrylglycydylether, 150 parts of toluene, and 2% isopropyl alcohol solution of chloroplatinic acid (the amount of which was such that the platinum accounted for 20 ppm of the siloxane); this mixture was heated at 100° C. for six hours; then it was cooled down to 40° C. and mixed with 100 parts of γ-aminopropyltriethoxysilane (KBE-903) and 650 parts of toluene, whereby Treater Sample IV was obtained.

(VI)

Apart from this, a varnish for impregnation was prepared in the following manner: 100 parts of solid silicone resin (KR-220, a trade name of and manufactured by Shin-Etsu Chemical Co., Ltd.) was dissolved in a mixture consisting of 200 parts of isopropyl alcohol and 800 parts of toluene, and then 0.7 parts of 85% orthophosphoric acid was added.

This varnish was applied uniformly to each laminated mica, treated with the respective Treater Sample, for impregnation, the application amount of the varnish being measured carefully such that the resin would account for 8.5 wt % of the resulting prepreg, which was then dried at 130° C.

Twelve sheets of thus-made prepreg were piled together and sandwiched between a pair of hot plates preheated to 180° C.; the hot plates were then caused to press the prepreg at a pressure of 15 kg/cm² for 60 minutes, whereby a silicone resin-mica laminate was obtained. Thus, four kinds of silicone resin-mica laminate, i.e. Examples 1 through 4 were obtained.

Table 1 shows the appearances and the thicknesses of these laminates, and also their bending strengths under the normal condition and under three different conditions ① through ③, described below. The laminates were also put under Condition ④, described below, and were measured of their coefficients of water absorption (%) and the result is entered in Table 1.

Condition ①: subjected to 96% RH at 25° C. for 2 days.
Condition ②: boiled in water at 100° C. for 30 minutes.
Condition ③: heated at 500° C. for 30 minutes.
Condition ④: dipped in water of 25° C. for 24 hours.

In addition to above-described measurements, the laminates of Examples were measured of their volume resistivity under the normal condition as well as under Condition ④.

COMPARATIVE EXAMPLE 1

In Comparative Example 1, a silicone resin-mica laminate was obtained in the same manner as in the case of Example 1 except in that the use of Treater Sample I was omitted.

The resulting silicone resin-mica laminate was estimated in terms of the same properties as Examples 1 through 4, and the results are given in Table 1.

Table 1 also shows the coefficients of water absorption measured of the silicone resin-mica laminate pieces which were subjected to Condition ④, as well as the volume resistivities of the silicone resin-mica laminate pieces measured under the normal condition and under Condition ④.

As is apparent from Table 1, Examples 1 through 4 of silicone resin-mica laminate of the invention excel Comparative Example 1 in moisture resistance, water resistance, mechanical strength, and heat resistance, etc.

Also, the silicone resin-mica laminate pieces of Examples 1 through 4 were heated quickly to 500° C. and maintained at the same temperature for 30 minutes, but they did not show swelling, color changes, or any other changes in appearance, nor did they fume or give odors.

EXAMPLE 5

Pieces of silicone resin-mica laminate were made in the same manner as Example 1 except in that two kinds of mica (mica A and mica B) having different moisture contents were used. Some of these pieces were made while it was rainy, and the others were made while it was sunny. The two kinds of mica were prepared in the following manners.

Mica A: laminated mica was left in a thermo-hygrostat for 5 hours wherein the temperature was maintained at 40° C. and the relative humidity at 95% RH, thereby letting the mica absorb moisture.

Mica B: laminated mica was left for 3 hours in a hot-air circulation drier chamber wherein the temperature was 120° C., thereby drying the mica.

The resulting pieces of the silicone resin-mica laminate were tested of their properties and the results are shown in Tables 2 and 3, the former collecting the results of the pieces made during rainy time, and the latter during sunny time.

COMPARATIVE EXAMPLE 2

Pieces of silicone resin-mica were made in the same way as Example 5 except in that the use of Treater Sample I was omitted.

The resulting pieces of the silicone resin-mica were estimated in terms of the same properties as in the case of Example 5, as shown in Tables 2 and 3.

As is apparent from Tables 2 and 3, the use of Treater Sample I rendered the resulting silicone resin-mica laminate unaffected by the humidity of the ambient air during manufacturing, and also other properties were greatly improved.

EXAMPLES 6 THROUGH 12 AND COMPARATIVE EXAMPLES 3 THROUGH 5

Pieces of silicone resin-mica laminate were made in the same manner as Example 1 except in that Treater Sample I was modified such that the compounding ratio of γ-aminopropyltriethoxysilane (KBE-903) to γ-glycidoxypropyltrimethoxysilane (KBM-403) was set as shown in the columns under the captions "KBE-903" and "KBM-403" in Table 4; also, the sum of the amounts of γ-aminopropyltriethoxysilane and γ-glycidoxypropyltrimethoxysilane used as treater sample was varied such that its weight percentage against the laminated mica would be as shown in the column under the caption "amount of treater sample, wt %". In particular, in the case of Comparative Example 3 no treater sample was used, and in the case of Comparative Example 4 only KBE-903 and no KBM-403 was used.

The resulting pieces of silicone resin-mica laminate were estimated in terms of bending strength under the normal condition and Condition ②, in terms of coefficient of water absorption under Condition ③, and in terms of volume resisitivity under the normal condition and Condition ③. The results indicate that Samples of the silicone resin-mica laminate outperform the Comparative Samples in all of the properties shown in Table 4.

TABLE 1

|  | EXAMPLES | | | | COMPARATIVE EXAMPLE |
|---|---|---|---|---|---|
|  | 1 | 2 | 3 | 4 | 1 |
| appearance | good | good | good | good | good |
| thickness (mm) | 0.73 | 0.73 | 0.72 | 0.73 | 0.75 |
| bending strength (kg/mm²) | | | | | |
| normal condition | 36.4 | 34.2 | 34.1 | 36.3 | 27.4 |
| Condition ① | 35.8 | 33.0 | 33.8 | 34.6 | 20.6 |
| Condition ② | 25.3 | 24.0 | 26.1 | 25.4 | 4.8 |
| Condition ③ | 34.8 | 34.0 | 33.8 | 35.7 | 24.3 |
| coefficient of water absorption (%) | | | | | |
| Condition ④ | 0.07 | 0.09 | 0.05 | 0.07 | 5.4 |
| volume resistivity ($\times 10^{15} \Omega \cdot cm$) | | | | | |
| normal condition | 9.1 | 7.9 | 14 | 8.1 | 6.4 |
| Condition ④ | 4.2 | 5.0 | 3.3 | 4.1 | unmeasurable |

TABLE 2

|  | EXAMPLE 5 | | COMPARATIVE EXAMPLE 2 | |
|---|---|---|---|---|
| weather rainy (95% RH; 22° C.) | | | | |
| mica | A | B | A | B |
| Treater Sample | I | I | none | none |
| bending strength (kg/mm²) | | | | |
| normal condition | 34.1 | 34.8 | 17.1 | 25.6 |
| Condition ① | 32.8 | 32.2 | 10.8 | 19.7 |
| Condition ② | 21.4 | 24.0 | 3.5 | 5.3 |
| Condition ③ | 33.0 | 31.9 | 19.6 | 24.2 |
| coefficient of water absorption (%) | | | | |
| Condition ④ | 0.09 | 0.07 | 9.6 | 5.4 |
| volume resistivity (× 10¹⁵Ω · cm) | | | | |
| normal condition | 2.3 | 7.4 | 0.66 | 1.6 |
| Condition ④ | 1.2 | 3.6 | unmeasurable | unmeasurable |

TABLE 3

|  | EXAMPLE 5 | | COMPARATIVE EXAMPLE 2 | |
|---|---|---|---|---|
| weather sunny (44% RH; 26° C.) | | | | |
| mica | A | B | A | B |
| Treater Sample | I | I | none | none |
| bending strength (kg/mm²) | | | | |
| normal condition | 34.8 | 36.7 | 24.3 | 27.8 |
| Condition ① | 30.7 | 33.4 | 18.3 | 21.4 |
| Condition ② | 22.2 | 25.1 | 4.0 | 6.3 |
| Condition ③ | 32.6 | 35.0 | 22.6 | 25.2 |
| coefficient of water absorption (%) | | | | |
| Condition ④ | 0.09 | 0.06 | 6.2 | 4.4 |
| volume resistivity (× 10¹⁵Ω · cm) | | | | |
| normal condition | 4.7 | 23.0 | 0.99 | 7.2 |
| Condition ④ | 1.0 | 4.2 | unmeasurable | unmeasurable |

TABLE 4

| | compounding ratio of weight | | amount used for treatment (wt %) | bending strength (kg/mm²) | | water absorption coefficient (%) | volume resistivity (Ω · cm) | |
|---|---|---|---|---|---|---|---|---|
| | KBE-903 | KBM-403 | | normal condition | Condition ② | Condition ③ | normal condition | Condition ③ |
| COMPARATIVE EXAMPLE 3 | 0 | 0 | 0 | 27.4 | 4.8 | 5.4 | 6.4 × 10¹⁵ | unmeasurable |
| COMPARATIVE EXAMPLE 4 | 1 | 0 | 0.2 | 31.2 | 13.6 | 0.53 | 6.8 × 10¹⁵ | 7.6 × 10¹³ |
| EXAMPLE 6 | 0.25 | 0.75 | 0.2 | 33.7 | 21.8 | 0.09 | 8.4 × 10¹⁵ | 2.3 × 10¹⁵ |
| EXAMPLE 7 | 0.5 | 0.5 | 0.2 | 36.4 | 25.3 | 0.07 | 9.1 × 10¹⁵ | 4.2 × 10¹⁵ |
| EXAMPLE 8 | 0.75 | 0.25 | 0.2 | 35.0 | 23.0 | 0.09 | 7.6 × 10¹⁵ | 3.1 × 10¹⁵ |
| COMPARATIVE EXAMPLE 5 | 0 | 1 | 0.2 | 29.8 | 11.4 | 0.60 | 5.3 × 10¹⁵ | 5.0 × 10¹³ |
| EXAMPLE 9 | 0.5 | 0.5 | 0.05 | 32.4 | 20.6 | 0.12 | 3.6 × 10¹⁵ | 1.7 × 10¹³ |
| EXAMPLE 10 | 0.5 | 0.5 | 0.5 | 35.8 | 24.6 | 0.07 | 8.8 × 10¹⁵ | 3.7 × 10¹⁵ |
| EXAMPLE 11 | 0.5 | 0.5 | 1.0 | 33.0 | 21.0 | 0.10 | 5.6 × 10¹⁵ | 2.0 × 10¹⁵ |
| EXAMPLE 12 | 0.5 | 0.5 | 5.0 | 30.0 | 17.8 | 0.15 | 2.6 × 10¹⁵ | 1.0 × 10¹⁵ |

What is claimed is:

1. A silicone resin-mica moisture resistant laminate formed from at least two sheets of laminated mica, which laminate comprises
   (i) mica layers formed from mica having a thickness of from about 0.01 mm to about 0.5 mm whose surfaces are coated with
   (ii) intermediate layers of a cured mixture of (a) at least one of an amino group-containing alkoxysilane compound and a hydrolyzed derivative thereof and (b) an epoxy group-containing organic silicon compound, in a weight ratio of between 90:10 and 10:90 and with
   (iii) silicone resin layer, wherein each neighboring pair of mica and silicone resin layers sandwich an intermediate layer (ii),
   said epoxy group-containing organic silicon compound being a siloxane represented by the following formula:

$$R_k R'_m Si(OR'')_n O_{(4-k-m-n)/2}$$

where R is a monovalent organic group having at least one epoxy group, R' and R'' are, respectively, a hydrogen atom or a substituted or unsubstituted monovalent hydrocarbon group and k, m, and n are positive numbers satisfying the inequalities:

$$0.2 \leq k \leq 1$$

$$0 \leq m \leq 3$$

$$2 \leq n \leq 3$$

$$2 \leq k+m+n \leq 4.$$

2. A silicone resin-mica laminate according to claim 1, wherein the amino group-containing organic silicon compound is a compound of the formula $$A-\underset{\underset{H}{|}}{N}-R^1-Si\underset{\underset{R^2_n}{|}}{\leftarrow}OR^3]_{3-n}$$

wherein A is a hydrogen atom, an alkyl group of up to 8 carbon atoms, monocyclic or bicyclic aryl which is unsubstituted or substituted by alkyl, a halogen atom, a nitro group or an aminoalkyl group with one to three carbons in the alkyl group.

3. A silicone resin-mica laminate according to claim 1, wherein the weight percent ratio of the amino group-containing alkoxysilane compound to the epoxy group-containing organic silicon compound is between 80:20 and 20:80.

4. A silicone resin-mica laminate according to claim 1, wherein the amino group-containing organic silicon compound is a compound of the formula $$A-\underset{\underset{H}{|}}{N}-R^1-Si\underset{\underset{R^2_n}{|}}{\leftarrow}OR^3]_{3-n}$$

wherein A is a hydrogen atom, an alkyl group of up to 8 carbon atoms, monocyclic or bicyclic aryl which is unsubstituted or substituted by alkyl, a halogen atom, a nitro group or an aminoalkyl group with one to three carbons in the alkyl group, and wherein the weight percent ratio of the amino group-containing alkoxysilane compound to the epoxy group-containing organic silicon compound is between 80:20 and 20:80.

5. A silicone resin-mica laminate according to claim 4, wherein the amino group-containing alkoxysilane compound is selected from the group consisting of γ-aminomethyltrimethoxysilane; γ-aminomethyltriethoxysilane; γ-aminopropyltrimethoxysilane; γ-aminopropyltriethoxysilane; γ-aminopropyltripropoxysilane; γ-aminopropylmethyldimethoxysilane; γ-aminopropylmethyldiethoxysilane; γ-aminopropylethyldiethoxysilane; γ-aminopropylpropyldiethoxysilane; N-β-(aminoethyl)-γ-aminopropyltrimethoxysilane, N-β-(aminoethyl)-γ=aminopropylmethyldimethoxysilane, and N-phenyl-γ-aminopropyltrimethoxysilane, wherein the epoxy group-containing organic silicon compound is selected from the group consisting of γ-glycidoxypropyltrimethoxysilane, γ-glycidoxypropyltriethoxysilane, γ-glycidoxypropylmethyldimethoxysilane, γ-glycidoxypropylmethyldiethoxysilane, β-(3,4-epoxycyclohexyl)ethyltrimethoxysilane, β-(3,4-epoxycyclohexyl)ethyltriethoxysilane, and β-(3,4-epoxycyclohexyl)ethylmethyldimethoxysilane, and wherein the silicone resin is an organosiloxane of the formula $R^5{}_aSi(OR^6)_bO_{(4-a-b)/2}$ wherein $R^5$ is hydrogen or a monovalent hydrocarbon group of 1–9 carbon atoms.

* * * * *